(12) United States Patent
Lin

(10) Patent No.: US 8,559,811 B1
(45) Date of Patent: Oct. 15, 2013

(54) FLASHLIGHT MODULE, LENS MODULE AND IMAGE CAPTURING DEVICE

(75) Inventor: Tzu-Chih Lin, Hsinchu County (TW)

(73) Assignee: Altek Corporation, Hsinchu (TW)

( * ) Notice: Subject to any disclaimer, the term of this patent is extended or adjusted under 35 U.S.C. 154(b) by 0 days.

(21) Appl. No.: 13/550,609

(22) Filed: Jul. 17, 2012

(30) Foreign Application Priority Data

May 30, 2012 (TW) .............................. 101119356 A

(51) Int. Cl.
*G03B 15/03* (2006.01)
(52) U.S. Cl.
USPC .......................................... 396/177; 396/199
(58) Field of Classification Search
USPC .......................................... 396/176–178, 199
See application file for complete search history.

(56) References Cited

U.S. PATENT DOCUMENTS

| 5,036,345 A | * | 7/1991 | Kawano | 396/113 |
| 5,987,263 A | * | 11/1999 | Toyoda et al. | 396/178 |
| 7,519,288 B2 | * | 4/2009 | Kim | 396/177 |
| 2005/0265707 A1 | * | 12/2005 | Chang | 396/199 |
| 2009/0034958 A1 | * | 2/2009 | Dierenbach | 396/199 |

* cited by examiner

*Primary Examiner* — WB Perkey
(74) *Attorney, Agent, or Firm* — Jianq Chyun IP Office

(57) ABSTRACT

A flashlight module adapted to be disposed on an image capturing device is provided. The image capturing device has a main body, a lens disposed on the main body and a lens ring disposed around the lens. The flashlight module includes a body and a flashlight. The body has a first end and a second end opposite to the first end, and the body is pivoted to the lens ring through the first end. The flashlight is disposed in the body. When the body is in a first status, the first end and the second end are adapted to be attached to the lens ring. When the body is in a second status, the second end is popped up to a predetermined distance.

25 Claims, 3 Drawing Sheets

FLASHLIGHT MODULE, LENS MODULE AND IMAGE CAPTURING DEVICE

CROSS-REFERENCE TO RELATED APPLICATION

This application claims the priority benefit of Taiwan application serial no. 101119356, filed on May 30, 2012. The entirety of the above-mentioned patent application is hereby incorporated by reference herein and made a part of this specification.

BACKGROUND OF THE INVENTION

1. Field of the Invention

The present invention relates to a flashlight module and particularly to a flashlight module and an image capturing device having the same.

2. Description of Related Art

In the current information age, people are becoming more and more dependent on electronic devices. In order to meet the requirements of high speed, high efficiency and compactness, various portable electronic devices having image capturing functions have become the mainstream products and have all been the indispensible devices in the modern life. In recent years, various image capturing devices (e.g., conventional cameras, digital cameras, mobile phones having image capturing functions, or the like) have been extensively adopted. In order to improve the capturing function of the image capturing devices, in general, disposing a flashlight module in the image capturing device is necessary for providing extra brightness to obtain a clearer image.

In general, when high optical zoom-ratio lenses are applied in digital still cameras (DSC) or mobile phones having image capturing functions, the flashlight module is required to have pop-up function, so that during the image capturing process, the emitted flash is not shielded by the lens cone which is extracted from the zoom-ratio lens. In general, the flashlight module having pop-up function is designed to be connected with the main body of the image capturing device. However, in such configuration, the volume of the main body of the image capturing device may be occupied by the flashlight module, so that the image capturing device disposed with a flashlight module having pop-up function has been unable to comply with the requirement of miniaturization.

SUMMARY OF THE INVENTION

The present invention provides a flashlight module adapted to be disposed on an image capturing device, wherein the flashlight module is adapted to be driven to emit flash light in both pop-up status and non-pop-up status, and the flashlight module is attached to the lens ring so that the flashlight module does not occupy the space of main body of the image capturing device.

The present invention further provides a lens module, adapted to be installed to an image capturing device, wherein the flashlight module disposed on the lens ring is adapted to be driven to emit flash light in both pop-up status and non-pop-up status, and the flashlight module is attached to the lens ring so that the flashlight module does not occupy the space of main body of the image capturing device.

The present invention further provides an image capturing device, wherein the flashlight module disposed on the lens ring is adapted to be driven to emit flash light in both pop-up status and non-pop-up status, and the flashlight module is attached to the lens ring so that the flashlight module does not occupy the space of main body of the image capturing device.

In the invention, a flashlight module adapted for an image capturing device is provided. The image capturing device includes a main body, a lens disposed on the main body and a lens ring disposed around the lens. The flashlight module includes a body and a flashlight. The body has a first end and a second end connected to the first end, wherein the body is pivoted to the lens ring through the first end. The flashlight is disposed in the body. Herein when the body is in a first status, the first end and the second end are adapted to be attached to the lens ring. When the body is in a second status, the second end is adapted to be popped up to a predetermined distance from the lens ring.

In the invention, a lens module adapted for an image capturing device is provided. The image capturing apparatus has a main body. The lens module includes a lens, a lens ring and a flashlight module. The lens is disposed on the main body of the image capturing device. The lens ring is disposed around the lens. The flashlight module includes a body and a flashlight. The body has a first end and a second end connected to the first end, wherein the body is pivoted to the lens ring through the first end. The flashlight is disposed in the body. Herein when the body is in a first status, the first end and second end are adapted to be attached to the lens ring. When the body is in a second status, the second end is adapted to be popped up to a predetermined distance from the lens ring.

The present invention further provides an image capturing device including a main body and a lens module. The lens module is installed to the main body and includes a lens, a lens ring and a flashlight module. The lens is disposed on the main body of the image capturing device. The lens ring is disposed around the lens. The flashlight module includes a body and a flashlight. The body has a first end and a second end connected to the first end, wherein the body is pivoted to the lens ring through the first end. The flashlight is disposed in the body. Herein when the body is in a first status, the first end and the second end are adapted to be attached to the lens ring. When the body is in a second status, the second end is adapted to be popped up to a predetermined distance from the lens ring.

In the invention, an image capturing device is further provided. The image capturing device includes a main body and a lens module installed to the main body. The flashlight module includes a body and a flashlight. The body is in a curve shape, surrounds a portion of periphery of the lens by taking the lens as a center and substantially is a portion of the lens ring, wherein the body has a first end and a second end connected to the first end, and the body is pivoted to the lens ring through the first end. The flashlight is disposed in the body. Herein when the body is in a first status, the first end and the second end are adapted to be attached to the lens ring, and the body and the lens ring substantially form an annular shape. When the body is in a second status, the second end is adapted to be popped up to a predetermined distance from the lens ring.

According to an exemplary embodiment of the present invention, when the body is in one of the first status and the second status, the flashlight is adapted to be driven to emit flash light.

According to an exemplary embodiment of the present invention, the body is in a curve shape and surrounds a portion of periphery of the lens by taking the lens as a center.

According to an exemplary embodiment of the present invention, the flashlight further includes a light source, a light source driving assembly and a reflective cover. The light source driving assembly is electrically connected to the light source. The reflective cover has an opening, wherein the light source is located in the reflective cover and the opening exposes the light source.

According to an exemplary embodiment of the present invention, the light source driving assembly further includes a circuit board and a trigger element.

According to an exemplary embodiment of the present invention, the light source is a lamp.

According to an exemplary embodiment of the present invention, the body is electrically to a main board disposed in the main body of the image capturing device.

According to an exemplary embodiment of the present invention, the flashlight module further includes an elastic element disposed on the lens ring and located between the second end of the body and the lens ring, wherein when the body is in the second status, the elastic element is adapted to drive the second end to pop up to the predetermined distance from the lens ring.

In light of the above, the flashlight module is disposed on the lens ring and attached to the lens ring, so that the flashlight module and the lens ring form an annular shape, and thus the flashlight module does not occupy the volume of the main body of the image capturing device. Accordingly, since the reducing of thickness of the main body of the image capturing device is not restricted due to the flashlight being not embedded in the main body, it is possible to reduce the thickness of the image capturing device to realize miniaturization design. Furthermore, the flashlight module of the present invention can emit flash light in both pop-up status and non-pop-up status and thus can provide much more convenience to users.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
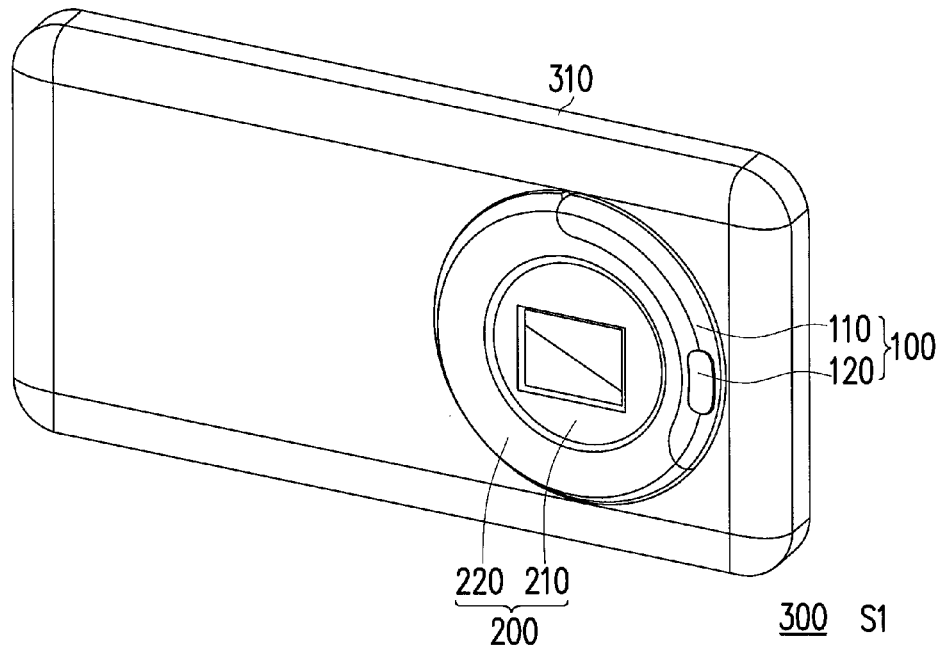
FIG. 1 is a schematic view of an image capturing device according to an exemplary embodiment of the present invention.

FIG. 1 is a schematic view of an image capturing device according to an exemplary embodiment of the present invention. In the embodiment, the image capturing device is a conventional camera, a digital camera, a mobile phone having image capturing functions, or any other electronic device having image capturing function, for example. Referring to FIG. 1, the image capturing device 300 includes a main body 310 and a lens module 200. The lens module 200 is installed to the main body 310 and includes a lens 210, a lens ring 220 and a flashlight module 100. In the embodiment, the image capturing device 300 uses a high optical zoom-ratio lens, for example. The lens 210 is installed to the main body 310, and for example is a high optical zoom-ratio lens. The lens ring 220 is disposed around the lens 210. For example, the lens ring 210 is detachably installed on the lens ring 220. On the other hand, the lens 210 may also be fixedly (un-detachable by the user with bare hands) disposed on the lens ring 220, and the present invention is not limited thereto. The flashlight module 100 is disposed on the lens ring 220 and includes a body 110 and a flashlight 120. The body 110 has a first end 112 and a second end 114 connected to the first end 112, wherein the body 110 is pivoted to the lens ring 220 through the first end 112. The flashlight 120 is disposed in the body 110.

Figure 2:
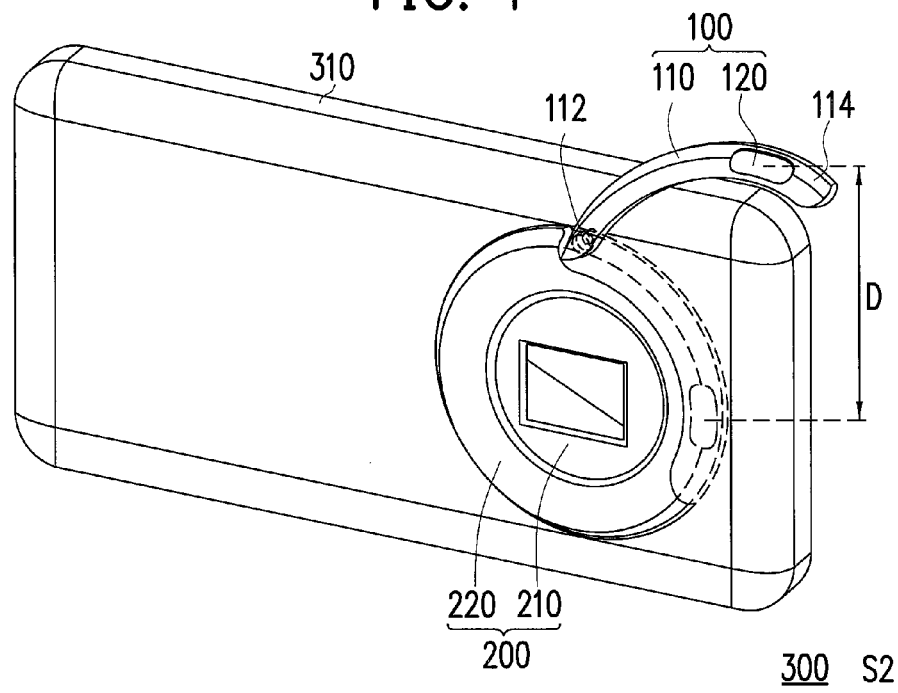
FIG. 2 illustrates that the flashlight module of the image capturing device in FIG. 1 is in the second status.

FIG. 2 illustrates that the flashlight module of the image capturing device in FIG. 1 is in the second status. FIG. 1 illustrates that the flashlight module 100 of the image capturing device 300 is in the first status. Referring to FIG. 1 and FIG. 2, in the embodiment, a pivot (not shown) can be disposed on the lens ring 220, and a pivoting groove (not shown) can be correspondingly disposed at the first end 112 of the body 110. However in other embodiments not shown in the figures, the pivot can also be disposed at the first end 112, and the pivoting groove can be disposed on the lens ring 220, as long as the body 110 may be adapted to move to a predetermined distance with respect to the lens ring 220, and the present invention is not limited thereto. The flashlight module 100 further includes an elastic element (not shown) disposed on the lens ring 220 and located between the second end 114 and the lens ring 220.

As shown in FIG. 1, when the body 110 is in a first status S1, the first end 112 and the second end 114 are adapted to be attached to the lens ring 220. As shown in FIG. 2, when the body 110 is in a second status S2, the second end 114 is adapted to be popped up to a predetermined distance D from the lens ring 220. In such configuration, during the image capturing process, the lens cone extracted from the lens 210 obstructing the flash can be avoided. More specifically, the flashlight module 100 of the embodiment has the pop-up function. For example, if the flashlight module 100 is to be popped up, the user can press a press button (not shown) or directly press the second end 114 of the body 110, so that the second end 114 is released from latching and pops up to the predetermined distance D through the elastic element, and at this time the body 110 and the lens ring 220 are connected through the pivot of the lens ring 220. The present invention is not limited by the types of elastic element and the pop-up mechanism of the elastic element and the body 110, as long as the flashlight module can realize the pop-up function according to the present invention and the teaching of the aforementioned embodiments. For instance, in other embodiments not shown in the figures, an elastic element can also be disposed at the first end 112, in order that when the pop-up function is actuated the whole body 110 can pop up and separate with the lens ring 220, and in this time the body 110 and the lens ring 220 are connected through the elastic element.

It has to be noted that, the flashlight module 100 is different from the conventional flashlight modules, whether the body 110 is in the first status S1 or in the second status S2, the flashlight module 100 can be driven and emit flash light. In other words, the flashlight module 100 emits flash in both conditions when the body 110 is popped up and not popped up. Thus, the user can also flash the flashlight module 100 to capture an image when the lens 210 is not extracted and the flashlight module 100 is not popped up from the body 110.

Figure 3:
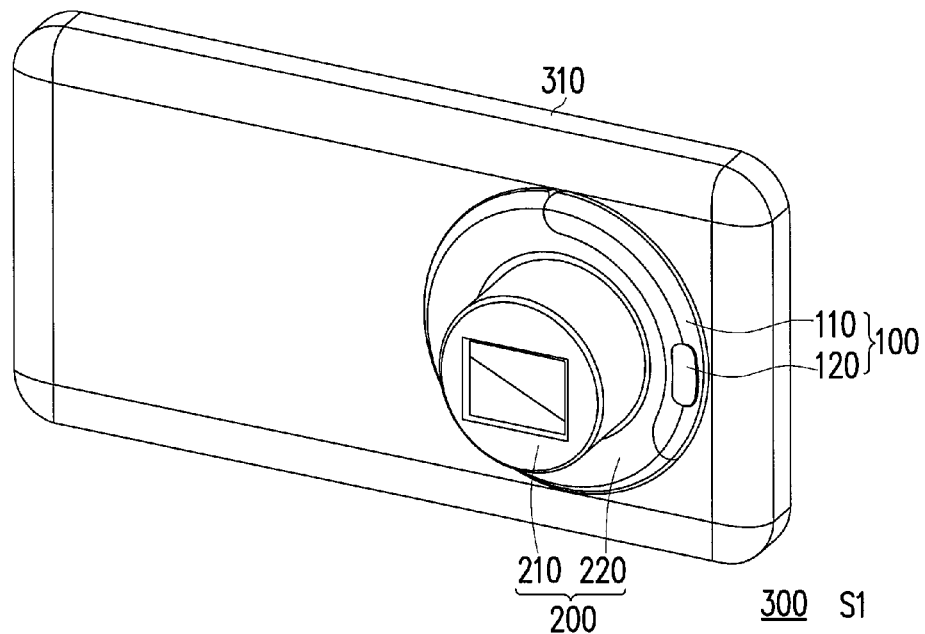
FIG. 3 illustrates that the lens of the image capturing device in FIG. 1 is extracted and the flashlight module is in the first status.
Figure 4:
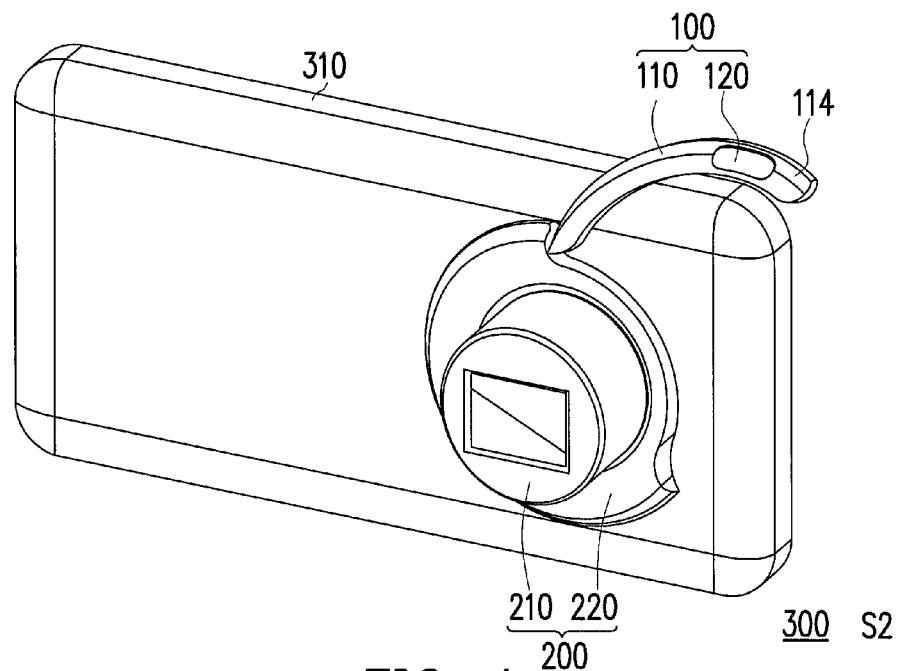
FIG. 4 illustrates that the lens of the image capturing device in FIG. 1 is extracted and the flashlight module is in the second status.

FIG. 3 illustrates that the lens of the image capturing device in FIG. 1 is extracted and the flashlight module is in the first status. FIG. 4 illustrates that the lens of the image capturing device in FIG. 1 is extracted and the flashlight module is in the second status. In the embodiment, the flashlight module 200 and the lens module 200 can operate independently. In more detailed, referring to FIG. 3 and FIG. 4, in the embodiment, when the lens 210 is extracted from the lens module 200, the body 110 of the flashlight module 100 can maintain to be in the first status S1, so that the user can capture images without flash and the flashlight module 100 not being actuated. When the lens 210 is extracted from the lens module 200, the body 110 of the flashlight module 100 can be actuated so that the body 110 can pop up to the predetermined distance D and the body 110 is in second status S2, so that the user can capture images with flash and the flashlight module 100 being actuated. In brief, during the user uses the image capturing device 300, it is possible that at the same time with the lens 210 being operated for adjusting focus, the pop-up function of the flashlight module 100 is to be actuated or not and the flash is to be emitted or not.

In addition, as shown in FIG. 1, the flashlight module 100 of the embodiment is designed to correspond with the annular shape of the lens ring 220. For instance, a portion of the lens ring 220 is designed to be the flashlight module 100, and the flashlight module 100 is disposed on the lens ring 220 and surrounding the periphery of the lens 210. Thus, the body 110 of the flashlight module 100 is in an annular shape. In more detailed, the body 110 forms an arc and is concentric with the lens ring 220, and the flashlight module 100 is substantially a portion of the lens ring 220. Accordingly, when the body 110 is in a first status S1, the flashlight module 100 and the lens ring 220 are substantially formed an annular shape. Additionally, the thickness of the flashlight module 100 can substantially be the same as the thickness of the lens ring 220, and the width of the body 110 can be substantially designed to be the same as the width of the lens ring 220. Nevertheless, the present invention should not be construed as limited to the embodiments set forth herein. In such configuration, the flashlight module 100 can be disposed outside the main body 310 of the image capturing device 300, in order that the flashlight module 100 may not occupy the volume of the main body 310, so that the image capturing device 300 can be designed with a smaller thickness to comply with the requirement of miniaturization.

Figure 5:
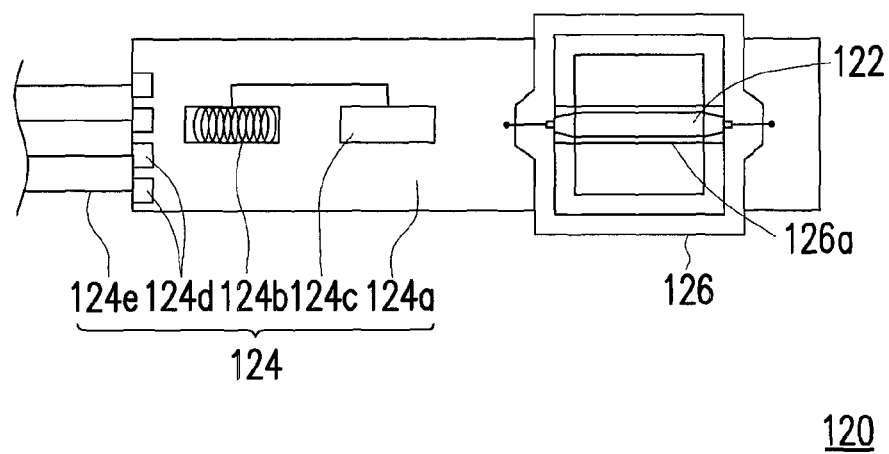
FIG. 5 is a partially enlarged view of the flashlight module of the image capturing device in FIG. 1.

FIG. 5 is a partially enlarged view of the flashlight module of the image capturing device in FIG. 1. Referring to FIG. 5, the flashlight 120 further includes a light source 122, a light source driving assembly 124 and a reflective cover 126. The light source 122 of the embodiment is a lamp, for example. But in other embodiments the light source can be selected as required, the present invention is not limited thereto. Referring to FIG. 5, the reflective cover 126 has an opening 126a, wherein the light source 122 is located in the reflective cover 126 and the opening 126a exposes the light source 122. The light source driving assembly 124 includes a circuit board 124a and a trigger element 124b. Herein the circuit board 124a can be disposed in the inner wall of the body 110 and located between the reflective cover 126 and the inner wall of the body 110. The light source 122 and the circuit board 124a are electrically connected for driving the light source 122 to emit flash light. A trigger element 124b is used in the embodiment for driving the light source 122 to emit flash light. For example, the trigger element 124b can be a trigger coil or any other trigger elements, but the present invention is not limited thereto. As shown in FIG. 5, the trigger element 124b has a trigger pad 124c disposed on the circuit board 124a, and the trigger pad 124c electrically connects the trigger element 124b and the circuit board 124a.

In the embodiment, the light source driving assembly 124 of the flashlight module 100 is electrically connected to a main board (not shown) disposed in the main body 310 of the image capturing device 300, in order to provide a power supply for the flashlight module 100. In addition, the light source assembly 124 further includes a plurality of contacts and a plurality of contact lines 124e, wherein the contacts 124d are disposed around the circuit board 124a and the contact lines 124e are respectively connected to the main body 310 of the image capturing device 300, so that the flashlight module 100 is connected to the main board of the main body 310 through the contact lines 124e for signal transmission or electrical connection. It has to be noted that, the light source 122, the light source driving assembly 124 and the reflective cover 126 are compactly disposed in the body 110 of the flashlight module 100, in order that the flashlight module 100 does not occupy the volume of the main body 310 of the image capturing device 300 and the thickness of the image capturing device 300 can further be reduced. Certainly, the present invention does not limit the type and the depositions of the light source driving assembly 124, which may vary depending upon actual design requirements.

In light of the foregoing, the flashlight module is disposed on the lens ring and attached to the lens ring, so that the flashlight module and the lens ring form an annular shape, and thus the flashlight module does not occupy the volume of the main body of the image capturing device. Accordingly, since the reducing of thickness of the main body of the image capturing device is not restricted due to the flashlight being not embedded in the main body, it is possible to reduce the thickness of the image capturing device to realize miniaturization design. Furthermore, the flashlight module of the present invention can emit flash light in both pop-up status and non-pop-up status and thus can provide much more convenience to users.

Although the invention has been described with reference to the above embodiments, it will be apparent to one of ordinary skill in the art that modifications to the described embodiment may be made without departing from the spirit of the invention. Accordingly, the scope of the invention will be defined by the attached claims not by the above detailed descriptions.

What is claimed is:

1. A flashlight module, adapted to be disposed on an image capturing device, the image capturing device having a main body, a lens disposed on the main body and a lens ring disposed around the lens, the flashlight module comprising:
   a body having a first end and a second end connected to the first end, wherein the body is pivoted to the lens ring through the first end; and
   a flashlight disposed in the body;
   wherein when the body is in a first status, the first end and the second end are adapted to be attached to the lens ring, when the body is in a second status, the second end is adapted to be popped up to a predetermined distance from the lens ring.

2. The flashlight module as claimed in claim 1, wherein when the body is in one of the first status and the second status, the flashlight is adapted to be driven to emit flash light.

3. The flashlight module as claimed in claim 1, wherein the body is in a curve shape and surrounds a portion of periphery of the lens by taking the lens as a center.

4. The flashlight module as claimed in claim 1, wherein the flashlight further comprises:
   a light source;
   a light source driving assembly electrically connected to the light source; and a reflective cover having an opening, wherein the light source is located in the reflective cover and the opening exposes the light source.

5. The flashlight module as claimed in claim 4, wherein the light source driving assembly comprises a circuit board and a trigger element.

6. The flashlight module as claimed in claim 4, wherein the light source is a lamp.

7. The flashlight module as claimed in claim 1, wherein the body is electrically to a main board disposed in the main body of the image capturing device.

8. The flashlight module as claimed in claim 1, further comprising an elastic element disposed on the lens ring and located between the second end of the body and the lens ring, wherein when the body is in the second status, the elastic element is adapted to drive the second end to pop up to the predetermined distance from the lens ring.

9. A lens module, adapted to be installed to an image capturing device, the image capturing device having a main body, the lens module comprising:
- a lens disposed on the main body of the image capturing device;
- a lens ring disposed around the lens; and
- a flashlight module, comprising:
  - a body having a first end and a second end connected to the first end, wherein the body is pivoted to the lens ring through the first end; and
  - a flashlight disposed in the body;
  - wherein when the body is in a first status, the first end and the second end are adapted to be attached to the lens ring, when the body is in a second status, the second end is adapted to be popped up to a predetermined distance from the lens ring.

10. The lens module as claimed in claim 9, wherein when the body is in one of the first status and the second status, the flashlight is adapted to be driven to emit flash light.

11. The lens module as claimed in claim 9, wherein the body is in a curve shape and surrounds a portion of periphery of the lens by taking the lens as a center.

12. The lens module as claimed in claim 9, wherein the flashlight further comprises:
- a light source;
- a light source driving assembly electrically connected to the light source; and
- a reflective cover having an opening, wherein the light source is located in the reflective cover and the opening exposes the light source.

13. The lens module as claimed in claim 12, wherein the light source driving assembly comprises a circuit board and a trigger element.

14. The lens module as claimed in claim 12, wherein the light source is a lamp.

15. The lens module as claimed in claim 9, wherein the body is electrically to a main board disposed in the main body of the image capturing device.

16. The lens module as claimed in claim 9, wherein the flashlight module further comprises an elastic element disposed on the lens ring and located between the second end of the body and the lens ring, wherein when the body is in the second status, the elastic element is adapted to drive the second end to pop up to the predetermined distance from the lens ring.

17. An image capturing device, comprising:
- a main body; and
- a lens module installed to the main body, the lens module comprising:
  - a lens disposed on the main body of the image capturing device;
  - a lens ring disposed around the lens; and
  - a flashlight module, comprising:
    - a body having a first end and a second end connected to the first end, wherein the body is pivoted to the lens ring through the first end; and
    - a flashlight disposed in the body;
    - wherein when the body is in a first status, the first end and the second end are adapted to be attached to the lens ring, when the body is in a second status, the second end is adapted to be popped up to a predetermined distance from the lens ring.

18. The image capturing device as claimed in claim 17, wherein when the body is in one of the first status and the second status, the flashlight is adapted to be driven to emit flash light.

19. The image capturing device as claimed in claim 17, wherein the body is substantially in a curve shape and surrounds a portion of periphery of the lens by taking the lens as a center.

20. The image capturing device as claimed in claim 17, wherein the flashlight further comprises:
- a light source;
- a light source driving assembly electrically connected to the light source; and
- a reflective cover having an opening, wherein the light source is located in the reflective cover and the opening exposes the light source.

21. The image capturing device as claimed in claim 20, wherein the light source driving assembly comprises a circuit board and a trigger element.

22. The image capturing device as claimed in claim 20, wherein the light source is a lamp.

23. The image capturing device as claimed in claim 17, further comprising a main board disposed in the main body, wherein the body is electrically to the main board.

24. The image capturing device as claimed in claim 17, wherein the flashlight module further comprises an elastic element disposed on the lens ring and located between the second end of the body and the lens ring, wherein when the body is in the second status, the elastic element is adapted to drive the second end to pop up to the predetermined distance from the lens ring.

25. A flashlight module, adapted to be disposed on an image capturing device, the image capturing device having a main body, a lens disposed on the main body and a lens ring disposed around the lens, the flashlight module comprising:
- a body being in a curve shape, surrounding a portion of periphery of the lens by taking the lens as a center and substantially being a portion of the lens ring, wherein the body has a first end and a second end connected to the first end, and the body is pivoted to the lens ring through the first end; and
- a flashlight disposed in the body;
- wherein when the body is in a first status, the first end and the second end are adapted to be attached to the lens ring, and the body and the lens ring substantially form an annular shape, when the body is in a second status, the second end is adapted to be popped up to a predetermined distance from the lens ring.

* * * * *